United States Patent
Gava et al.

(10) Patent No.: US 7,107,331 B2
(45) Date of Patent: Sep. 12, 2006

(54) SYSTEM AND METHOD FOR CONFIGURING DIGITAL IMAGE DEVICES

(75) Inventors: Fabio M. Gava, Irvine, CA (US); Andrey I. Savov, Laguna Hills, CA (US)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 688 days.

(21) Appl. No.: 10/106,002

(22) Filed: Mar. 25, 2002

(65) Prior Publication Data

US 2003/0182405 A1    Sep. 25, 2003

(51) Int. Cl.
G06F 15/16 (2006.01)
G06F 15/173 (2006.01)
G06F 15/177 (2006.01)

(52) U.S. Cl. .............. 709/221; 709/219; 709/226; 709/246

(58) Field of Classification Search ........ 709/201, 709/203, 223, 228, 229, 232, 234, 217, 219, 709/220–222
See application file for complete search history.

(56) References Cited

U.S. PATENT DOCUMENTS

| | | | |
|---|---|---|---|
| 4,649,479 A | 3/1987 | Advani et al. | |
| 5,465,364 A * | 11/1995 | Lathrop et al. | 719/321 |
| 5,664,195 A * | 9/1997 | Chatterji | 717/178 |
| 5,727,212 A | 3/1998 | Dinallo | |
| 5,901,319 A | 5/1999 | Hirst | |
| 5,910,180 A | 6/1999 | Flory et al. | |
| 5,966,540 A * | 10/1999 | Lister et al. | 717/174 |
| 6,091,508 A | 7/2000 | Love et al. | |
| 6,148,346 A | 11/2000 | Hanson | |
| 6,266,150 B1 | 7/2001 | Brossman et al. | |
| 6,330,613 B1 * | 12/2001 | Vlajnic et al. | 709/234 |
| 6,466,972 B1 * | 10/2002 | Paul et al. | 709/222 |
| 6,674,881 B1 * | 1/2004 | Bacus et al. | 382/128 |
| 2003/0023707 A1 * | 1/2003 | Ryan | 709/220 |
| 2004/0205695 A1 * | 10/2004 | Fletcher | 717/105 |

* cited by examiner

Primary Examiner—Rupal Dharia
Assistant Examiner—Quang N. Nguyen
(74) Attorney, Agent, or Firm—Tucker Ellis & West LLP

(57) ABSTRACT

A system and method is provided for implementing configuration of digital imaging device. The system comprises a configuration file and a series of components for implementing configuration parameters in different operating system environments. The file instructs the components where to look for a particular operating system in order to modify configuration parameters to match those set on the digital imaging device by a user.

31 Claims, 3 Drawing Sheets

```
root
 +-devices
 | +-copier
 | +-printer          202
 | | +copies=1
 | | +paper_size=letter
     204       206
```
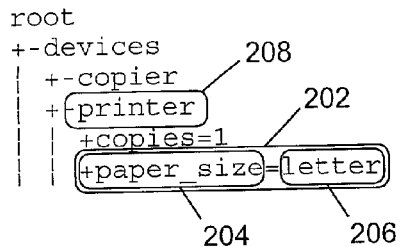

Fig. 2A

```
<?xml version="1.0"?>
<key name="ROOT">
  <key name="DEVICES">
    <key name="PRINTER">
      <value name="copies"     type="uint32">00000001</value>
      <value name="paper_size" type="uint32">00000003</value>
    </key>
  </key>
  <key name="SYSTEM">
    <key name="NETWORK">           208
      <key name="NETBIOS">  204
        <value name="name" type="virtual"></value>
        <key name="name">—208          210        206
          <value name="adapter"  type="string">INI file adapter
</value> 210
           <value name="file_name"—204
type="string">/etc/samba/smb.conf</value>   210   206
          <value name="section"  type="string">global</value>
          <value name="entry"    type="string">netbios name</value>
        </key>                                210   206
                                206
      </key>              204
    </key>
  </key>
</key>
```

Fig. 2B

```
<key name="SYSTEM">
  <key name="NETWORK">      208
    <key name="NETBIOS">  204    210           210
      <value name="name" type="virtual"></value>
      <key name="name">—208  204              206
        <value name="adapter" type="string">registry adapter
</value> 210
         <value name="key_name"—204                              206
type="string">HKEY_LOCAL_MACHINE\System\CurrentControlSet\Control\Comp
uterName\ComputerName</value>  204
        <value name="value"  type="string">ComputerName</value>
      </key>                              210   206
    </key>
  </key>
</key>
```

Fig. 2C

SYSTEM AND METHOD FOR CONFIGURING DIGITAL IMAGE DEVICES

BACKGROUND OF THE INVENTION

This invention pertains generally to digital imaging devices, and more specifically to a method and system for configuring digital imaging devices in an operating system independent manner.

Digital imaging devices ("DID") are complex machines that require administration attention. DIDs suitably include devices such as printers, fax machines, scanners, copiers, multifunctional peripherals ("MFPs"), and other like peripheral devices. In addition, DIDs are often connected to a network. In order to manage most DIDs on a network, administrators make use of either a Common Information Model ("CIM") or a Simple Networking Management Protocol ("SNMP"). Both architectures provide an almost universal and platform independent mechanism to access and interface with digital imaging devices. For each DID, the Original Equipment Manufacturer ("OEM") creates a description of device management information relating to CIM and SNMP networks. Such management information generally includes textual binary descriptors that describe the nature of the device, the management capabilities of the device, the names of the objects native to the device, the types of actions the device can perform, etc. Value-added resellers ("VAR"), OEMs, or vendors then utilize the device management information to access and control the DIDs and to create software for managing the DIDs. In particular, device drivers are developed.

Device drivers allow users or administrators to configure DIDs, but device drivers are specifically designed to interact with particular operating systems. As operating systems ("OS") and digital imaging devices change, device drivers must often be changed to accommodate a change in technology. One important characteristic of any system is its ability to modify its behavior without necessitating an internal system change, i.e. its ability to be reconfigured. Software systems play an important role in configuration because they are easily designed to control devices or processes such that they include a wide variety of options for changing the behavior of devices or processes. These software systems, also known as embedded systems, are widely used to provide users with a plurality of functions and methods for controlling electronic devices and driving their operation. For example, embedded systems suitably allow a user to configure the number of copies, paper size and orientation of the output of a DID.

In the past, embedded systems were deployed as firmware. Firmware is software stored in read-only memory ("ROM") or programmable ROM ("PROM") and is easier to modify than hardware but harder to modify than software stored on disk. Therefore, when embedded systems were implemented and deployed as firmware for specific microprocessors, changing the microprocessor often required that the software be significantly rewritten, and sometimes completely rewritten. As personal computers ("PCs") became a practical platform for embedded systems, different OS could be used with the same hardware, while making available a great number of services specific to the OS. However, choosing from the available OS is not an easy task, as characteristics like stability, robustness, performance and cost must be considered. Although additional functionality is created by the OS, a change in OS still requires the rewriting of software to address changes in the operating system. While this is an improvement over firmware, it is still difficult to change from one operating system to another. It would be preferably if DID configuration software were portable so that it could be executed on a variety of different OS while providing the same functionality.

When developing embedded system software for controlling configurable DIDs, storage for configuration parameters must be provided. Generally, this storage is provided by the OS. For example, configuration parameters are stored in the registry for Windows OS and configuration files in Linux OS. Consequently, configurable DIDs are generally dependent on an OS to receive configuration information. Therefore, when OS configuration settings change, new software must be written, compiled, provided to customers, and installed. It would be preferable if the software were platform independent such that a single version of a DID software program could accommodate multiple OS. Therefore, it would preferable if DID software programs accessed configuration parameters stored independently of such OS-specific configuration.

SUMMARY OF THE INVENTION

It is therefore an object of the present invention to provide an improved method of configuring digital imaging devices. According to the present invention, there is provided a system for configuring a digital imaging device. The system comprises a repository for storing digital imaging device configuration settings. The repository is suitably a configuration file or program such as Linux INI type file or the Windows registry. The system also comprises a configuration module having at least one virtual setting corresponding to a configuration setting in the repository. In addition, the system comprises a software module for detecting a virtual value in the configuration module and a software module for changing the corresponding digital imaging device configuration setting in the repository.

Also in accordance with the present invention, there is provided a method for changing a configuration setting for a digital imaging device. The method comprises sending a configuration change request to a software module and determining the virtual setting in a configuration module corresponding to the configuration request sent to the software module. After determining the virtual setting in the configuration module, the virtual setting is suitably located within the configuration module. After locating the virtual setting, the corresponding configuration setting in a digital imaging device configuration repository is determined from the virtual setting. Once the corresponding configuration setting is determined, it is changed to fulfill the configuration change request.

DESCRIPTION OF THE FIGURES

FIG. 2A is an illustration of an organizational structure of a configuration module according to the present invention;

FIG. 2B is an illustration of a portion of a configuration module corresponding to digital imaging device settings for Linux operating system according to the present invention;

FIG. 2C is an illustration of a portion of a configuration module corresponding to digital imaging device settings for a Windows operating system according to the present invention.

DETAILED DESCRIPTION OF THE INVENTION

Figure 1:
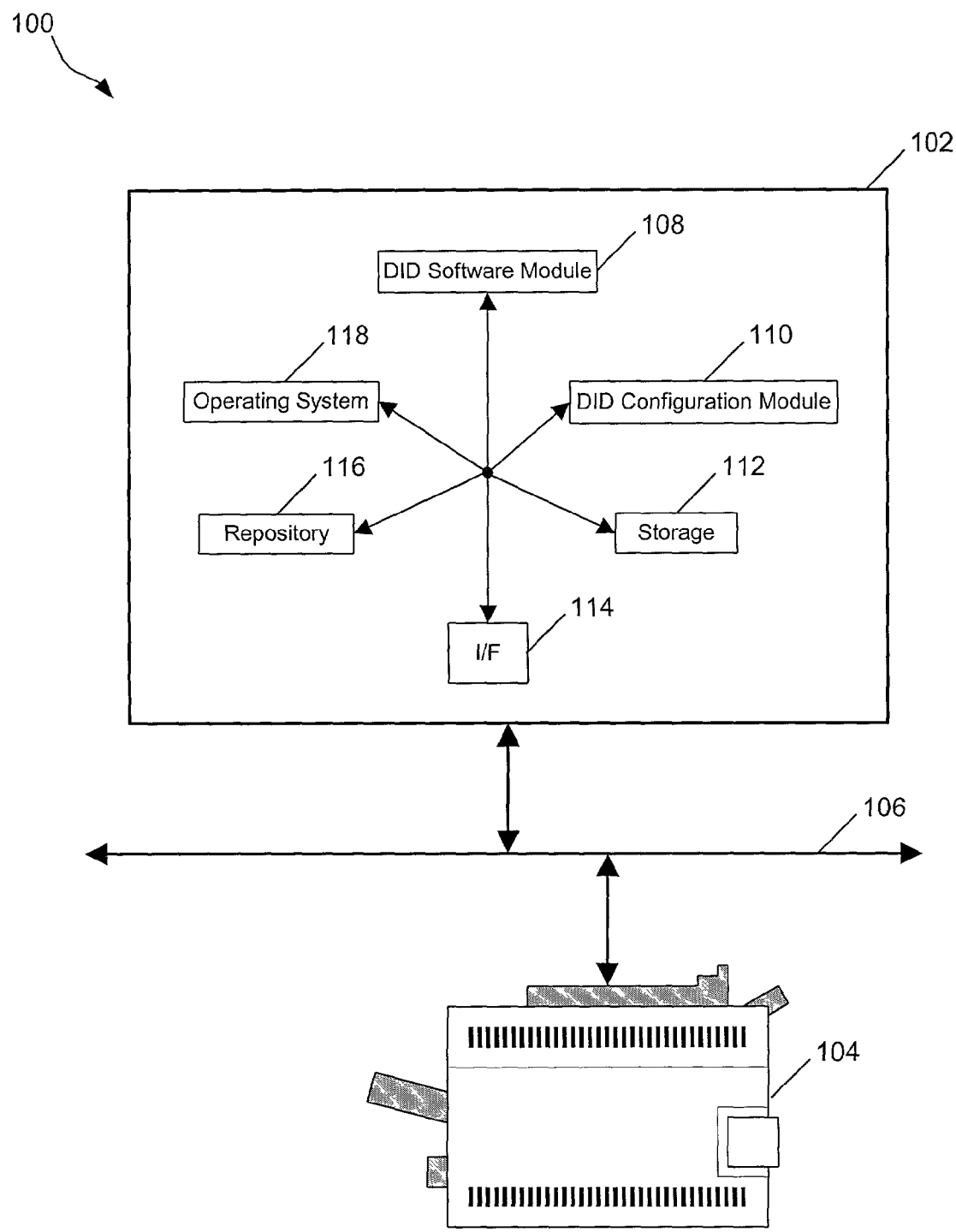
FIG. 1 is a system diagram illustrating a digital imaging device in a network environment in accordance with the present invention.

Turning now to FIG. 1, system diagram illustrating a digital imaging system in a network environment in accordance with the present invention is provided. The system 100 comprises a data transport network 106 illustrative of a LAN or WAN environment in which a preferred embodiment is provided. Connected to a data transport network 106 are a computer 102 and a DID 104. The network 106 is suitably any network and is suitably comprised of physical and transport layers such as illustrated by a myriad of conventional data transport mechanisms such Ethernet, Token-Ring™, 802.11(b), or other wire-based or wireless data communication mechanisms as will be apparent to one of ordinary skill in the art. The system 100 suitably comprises a computer, such as that represented by computer 102. The computer 102 is suitably either a Server or Client running an on any operating system, such as Windows NT, Windows XP, Unix, Linux, Macintosh or other operating system. In addition, the computer 102 is suitably a Thick Client or Thin Client, as will appreciated by those skilled in the art.

In the presently preferred embodiment, the computer is a Thick Client comprising a processor and storage running connected to a Linux network. The computer 102 is suitably in data communication with a data transport network 106 through a network interface 114. The computer 102 preferably comprises storage 112 which is suitably a hard disk or random access memory ("RAM") as will be appreciated by those skilled in the art. Stored on the storage 112 is preferably an operating system 118 for controlling the computer 102. Also suitably stored on storage 112 of computer 102 are a DID software module 108, a configuration module 110, and a repository 116.

Alternatively, the computer 102 is suitably a Thin Client. When the computer 102 is a Thin Client, any or all of the DID software module 108, the configuration module 110, and the repository 116 are suitably stored on a separate server.

The DID 104 is also suitably in data communication with a data transport system 106 through a network interface. Thus, a data path between one or more DIDs, such as that illustrated by DID 104, is in shared data communication with at least one computer, such as that illustrated by computer 102. The DID 104 is suitably any networked DID as will be appreciated to one of ordinary skill in the art. However, it should be noted that while the preferred embodiment of the present invention is a network system having a thick client and a DID, the present invention includes systems having a DID and personal computer connected directly to one another through a port such as a parallel port, serial port, USB port, or any other data transport mechanism as will be apparent to one of ordinary skill in the art.

The DID 104 suitably has an internal device controller suitably acting as a fully functional server with the necessary hardware and software that ensure proper operation of the DID 104 as will be appreciated by those skilled in the art. In addition, the DID 104 preferably comprises internal storage, which is suitably a hard disk or random access memory ("RAM") as will be appreciated by those skilled in the art. As such, in an alternate embodiment, any or all of the DID software module 108, the configuration module 110, and the repository 116 are suitably stored on a separate server.

In the presently preferred embodiment of the invention, a configuration change request is sent from the computer 102 to the DID 104 across the data transport network 106. For example, a user of computer 102 sends a configuration change request, which is received by the DID software module 108 that is preferably stored on storage 112 of the computer 102. In addition, a configuration change request is suitably sent by a software program, such as a word processing program or automation program, or by any other computer or user connected to the data transport network 106.

The DID software module 108 is suitably a software component, which is an object-oriented program that is platform independent. In addition, the DID software module 108 suitably a plurality of software modules or software components. One or more of the software components of the DID software module 108 suitably receive configuration change requests, determine the virtual settings associated with the configuration settings that are to be changed, find the appropriate virtual settings in a DID configuration module 110, and change the settings in a repository 116 corresponding with the virtual settings in a configuration module. Preferably the DID software module 108 is any piece of prewritten code that defines interfaces which can be called to provide the functionality that the component encapsulates. The DID software module 108 is preferably callable from multiple languages, or from multiple environments, or OS. It should be noted that the DID software module 108 of the present invention is suitably designed for any language binding, such as Common Object Request Broker Architecture ("CORBA"), NET, COM, DCOM, C++, ActiveX, etc. as will be appreciated by those skilled in the art.

The DID software module 108 suitably receives a configuration change request and determines the nature or type of request received. The configuration change request suitably corresponds to a configuration setting for the DID, and is suitably sent in any form or format, so long as the DID software module is designed to receive the form or format of the configuration change request. The determination of the nature of the configuration change request is suitably made by comparing the request with information stored on storage 112. The information used to determine the nature of the configuration change request is suitably stored in any form as will be appreciated by those skilled in the art.

In addition, the DID software module 108 suitably determines the operating system 118 running on computer 102 at the time the request is received. Preferably, a separate version of the DID software module 108 is installed for each operating system 118, but it is also within the scope of the present invention for a single version of the DID software module 108 to interact with multiple operating systems 118. Preferably, a separate DID configuration module 110 exists for each operating system 118 installed on computer 102. However, it is within the scope of the present invention for a single configuration module 110 to store virtual settings corresponding to configuration settings in multiple repositories 116 for multiple operating systems 118. For example, a single configuration module 110 suitably comprises at least one virtual setting corresponding to a first repository 116 for a first operating system and at least one virtual setting corresponding to a second repository 116 for a second operating system 118.

Preferably, the DID software module 108 determines the location of the DID configuration module 110 corresponding to the operating system 118 running at the time the configuration change request originated. This determination is suitably made at the time of installation of the DID software module 108 or each time a request is received by the DID software module 108. When a separate DID configuration module 110 exists for each operating system 118 installed on computer 102 as in the preferred embodiment, the determination is preferably made at the time of installation such that the location of the configuration module 110 is stored as a default setting. In addition, the DID software module 108 is suitably configurable to permit a user to change the location of the configuration module 110 after installation.

After determining the location of the DID configuration module 110, the DID software module 108 suitably determines the virtual setting in the DID configuration module 110 corresponding to the type of request received. The determination is suitably made by comparing the type of request with known virtual settings in the configuration module 110. The comparison is suitably made by examining a translation table or array, searching a database, or by any other method as will be apparent to those skilled in the art. Preferably, any translation table, array, database, etc. is stored on the storage 112. After determining the virtual setting in the DID configuration module 110, the software module 108 suitably locates the virtual setting in the DID configuration module 110.

The DID configuration module 110 is suitably any form of file capable of storing configuration information, is suitably a single file or a plurality of files, and preferably comprises a plurality of virtual settings. The DID configuration module 110 is preferably an extensible markup language ("XML") file, and is also suitably a simple text file, a database or database file, or any other searchable file as will be appreciated by those skilled in the art.

Turning now to FIG. 2A, an illustration of part of a DID configuration module 110 showing the general organizational structure is disclosed. As shown, the structure of the DID configuration module 110 suitably stores name and value pairs 202 of configuration names 204 and values 206. The name and value pairs 202 are suitably grouped according to the configuration parameter behavior they control and are preferably grouped in keys 208. It should be noted that any other organizational structure is not limiting. In addition, different organizational structures are suitably used when storing information corresponding to different types of repositories 116 as will be appreciated by those skilled in the art.

Turning now to FIG. 2B, an illustration of part of a DID configuration module 110 for a Linux OS is shown. The organizational structure of the DID configuration module 110 for a Linux OS is suitably the same as the structure shown in FIG. 2A. The DID configuration module 110 is preferably an XML file. The DID configuration module 110 suitably stores name and value pairs 202. The name and value pairs 202 are suitably grouped according to the configuration parameter behavior they control and preferably grouped in keys 208. Furthermore, keys 208 are suitably grouped under name and value pairs 202, names 204, or values 206, creating a multi-level organizational structure. The DID configuration module 110 suitably comprises virtual settings, which suitably comprise virtual setting information. Such information suitably comprises, for example, the name of a software module 108 to be called, as well as any parameters to be passed to the software module 108 to enable the software module 108 to affect a configuration change.

Preferably, the at least one name 204 grouped in a key 208 comprises a type 210 to indicate a virtual setting. In the presently preferred embodiment, the type 210 is "virtual" and no value 206 is paired with the name having a type 210 of "virtual". However, a name and value pair 202 suitably has a type of "virtual" as well. Preferably, a key 208 is grouped with the name 204 indicating a virtual setting. Name and value pairs 202 are preferably grouped in this key 208 and comprise virtual setting information. For a Linux operating system, the virtual setting information preferably comprises a plurality of name and value pairs 202, each comprising a type 210. The plurality of name and value pairs 202 preferably comprise virtual setting information which suitably comprises the name of a software module 108 to be called, as well as any parameters and additional descriptors for enabling the DID software module 108 to determine or make the modifications to the repository 116 necessary to fulfill a DID configuration request. In addition, the DID software module 108 suitably activates another DID software module 108 which then makes the modifications to the repository 116 necessary to fulfill the DID configuration request.

Turning now to FIG. 2C, an illustration of part of a DID configuration module 110 for a Windows type OS is shown. Like FIG. 2B, the organizational structure of the DID configuration module 110 for a Windows type OS is suitably the same as the structure shown in FIG. 2A. The DID configuration module 110 is preferably an XML file. The DID configuration module 110 suitably stores name and value pairs 202. The name and value pairs 202 are suitably grouped according to the configuration parameter behavior they control and preferably grouped in keys 208. Furthermore, keys 208 are suitably grouped under name and value pairs 202, names 204, or values 206, creating a multi-level organizational structure. The DID configuration module 110 suitably comprises virtual settings, which suitably comprise information corresponding to a repository 116. The virtual settings in the DID configuration module 110 suitably comprise name and value pairs 202. In addition, a name and value pair 202, a name 204, or a value 206 suitably comprises information relative to its type. The virtual setting information suitably comprises, for example, the name of a software module 108 to be called, as well as any parameters to be passed to a software module 108 to enable a software module 108 to affect a DID configuration change.

Preferably, the at least one name 204 grouped in a key 208 comprises a type 210 to indicate a virtual setting. In the presently preferred embodiment, the type 210 is "virtual" and no value 206 is paired with the name having a type 210 of "virtual". However, a name and value pair 202 suitably has a type of "virtual" as well. Preferably, a key 208 is grouped with the name 204 indicating a virtual setting. Name and value pairs 202 are preferably grouped in this key 208 and comprise virtual setting information. For a Windows type operating system, the virtual setting information preferably comprises a plurality of name and value pairs 202, each comprising a type 210. The plurality of name and value pairs 202 preferably comprise virtual setting information which suitably comprises the name of a software module 108 to be called, as well as any parameters and additional descriptors for enabling the DID software module 108 to determine or make the modifications to the repository 116 necessary to fulfill a DID configuration request. In addition, the DID software module 108 suitably activates another DID software module 108 which then makes the modifications to the repository 116 necessary to fulfill the DID configuration request. In a Windows environment, the repository 116 is suitably the system registry.

Figure 3:
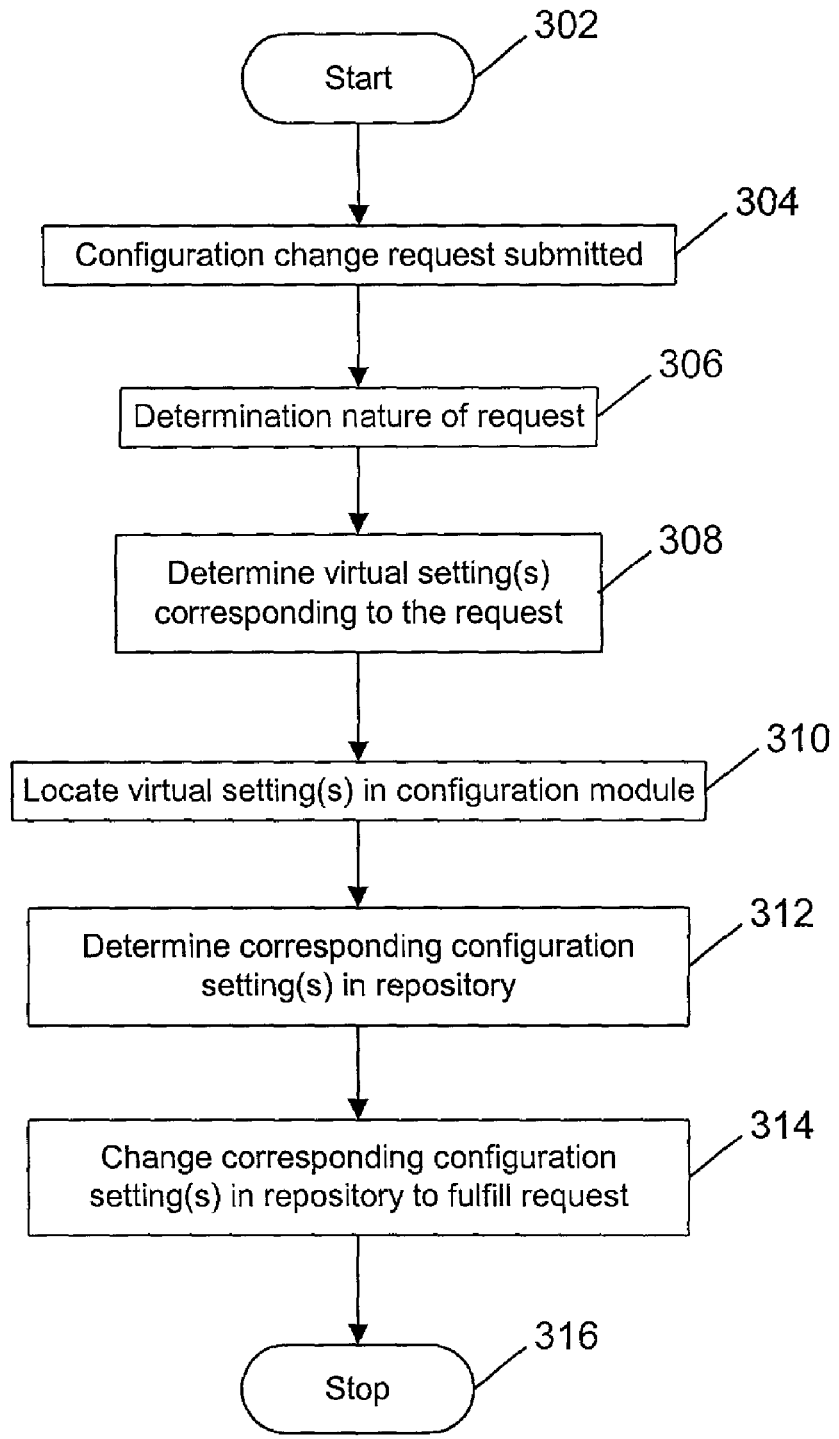
FIG. 3 is a flowchart generally depicting a method of configuring a digital imaging device in accordance with the present invention.

Turning now to FIG. 3, a flowchart generally depicting a method of configuring a digital imaging device in accordance with the present invention is shown. The general flow begins at start block 302, from which flow progresses to process block 304 wherein a DID configuration change request is submitted. The request is suitably submitted from a client on a network, but is also suitably sent by an administrator, a software program, such as a word processing program or automation program, or by any other computer or user with access to the DID. The request is preferably submitted to a DID software module 108, which is configured to receive DID configuration requests.

Flow then progresses to process block 306 where the nature of the configuration request (i.e. paper size change, layout change, etc.) is determined. Preferably, the DID software module 108 makes this determination. Progression continues to process block 308 where the virtual setting or settings corresponding to the configuration change request are determined. Preferably, the DID software module 108 makes this determination. Flow then progresses to process block 308 where the virtual setting or settings in the configuration module 110 corresponding to the configuration change request are determined.

Progression then continues to process block 310 where the location(s) of the virtual setting or settings in the configuration module 110 are determined. Because the system is designed is to be platform independent and because multiple configuration modules may exist in the determination of the virtual settings in the configuration module 110 may or may not require determining the location of a particular configuration module. Further, the determination of the correct configuration module 110 may or may not require that the operating system first be determined because the location of the configuration module 110 is suitably dependant on the type of operating system. In such circumstances, the DID software module 108 suitably determines the location of the configuration module 110.

Flow then progresses to process block 312 where the configuration settings in the repository 116 corresponding to the virtual settings in the configuration module are determined. The DID software module 108 suitably makes this determination using virtual setting information from the DID configuration module. Such information suitably comprises, for example, the location and type of the corresponding repository 116, the location within the corresponding repository 116 of a specific DID configuration setting, descriptors for changing repository 116 settings, or any other information relative to DID configuration.

Progression then continues to process block 314 where the setting or settings in the repository corresponding to the virtual setting or settings are changed in order to fulfill the configuration change request submitted in process 304. Flow then progresses to termination block 316.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for configuring a digital imaging device comprising:
    a repository for storing selected digital imaging device configuration settings associated with each of a plurality of operating environments, wherein the selected digital imaging device configuration settings are stored in the form of name and value pair, and wherein the name and value pairs are grouped according to the behavior they control and are grouped in keys;
    a configuration module having at least one virtual setting corresponding to a plurality of digital imaging device configuration settings in the repository;
    a software module including means for detecting a virtual setting in the configuration module that corresponds to one of the plurality of operating environments; and
    the software module further including means for changing the corresponding digital imaging device configuration setting in the repository to correspond to the one of the plurality of operating environments.

2. The system of claim 1 wherein the software module in element for detecting a virtual setting and the software module for changing the corresponding digital imaging device configuration setting are the same software module.

3. The system of claim 1 wherein the repository is a Linux configuration file.

4. The system of claim 1 wherein the repository is a Windows registry.

5. The system of claim 1 comprising a plurality of configuration modules, each configuration module corresponding to a type of operating system.

6. The system of claim 1 wherein the configuration module comprises a plurality of virtual settings.

7. The system of claim 1 wherein the configuration module comprises a first virtual setting corresponding to a configuration setting in a first repository, and a second virtual setting corresponding to a configuration setting in a second repository.

8. The system of claim 7 wherein the first repository corresponds to a first operating system, and a second repository corresponds to a second operating system.

9. The system of claim 1 wherein the configuration module is a text file.

10. The system of claim 1 wherein the configuration module is a database.

11. The system of claim 1 wherein the configuration module is an XML file.

12. The system of claim 1 wherein at least one key is a virtual key.

13. The system of claim 1 wherein the virtual setting stores information corresponding to the location of the repository.

14. The system of claim 1 wherein the virtual setting stores information corresponding to the location of a configuration setting in the repository.

15. The system of claim 1 wherein the virtual setting comprises a virtual key.

16. The system of claim 1 wherein the repository stores configuration settings in the form of name and value pairs.

17. The system of claim 1 wherein the software modules are compiled software components.

18. The system of claim 1 wherein the software modules comprise functionality that is callable and executable on a plurality of operating systems.

19. A system for configuring a digital imaging device in a network environment, the system comprising:
    a client communicatively coupled to a server;
    a digital imaging device communicatively coupled to the client;
    a repository for storing selected digital imaging device configuration settings associated with each of a plurality of operating environments, wherein the selected digital imaging device configuration settings are stored in the form of name and value pair, and wherein the name and value pairs are grouped according to the behavior they control and are grouped in keys;

a configuration module having at least one virtual setting corresponding to a plurality of digital imaging device configuration settings in the repository;

a software module including means for detecting a virtual setting in the configuration module that corresponds to one of the plurality of operating environments; and the software module further including means for changing the corresponding digital imaging device configuration setting in the repository to correspond to the one of the plurality of operating environments.

20. The system of claim 19 wherein the software module for detecting a virtual setting and the software module for changing the corresponding digital imaging device configuration setting are the same software module.

21. The system of claim 19 comprising a plurality of configuration modules, each configuration module corresponding to a type of operating system.

22. The system of claim 19 wherein the digital imaging device functions as the server to which to the client is communicatively coupled.

23. The system of claim 19 wherein the repository is located on a client machine.

24. The system of claim 19 wherein the repository is located on a server.

25. The system of claim 19 wherein the software module for detecting a virtual setting is located on a client machine.

26. The system of claim 19 wherein the software module for detecting a virtual setting is located on a server.

27. The system of claim 19 wherein a software module for changing a configuration setting is located on a client machine.

28. The system of claim 19 wherein a software module for changing a configuration setting is located on a server.

29. A method for changing a configuration setting for a digital imaging device comprising:

sending a configuration change request to a software module;

determining a virtual setting in a configuration module corresponding to the configuration change request sent to the software module, wherein the configuration module includes at least one virtual setting corresponding to a plurality of digital imaging device configuration settings associated with each of a plurality of operating environments, wherein the digital imaging device configuration settings are stored in a digital imaging device configuration repository, wherein the digital imaging device configuration settings are stored in the form of name and value pair, and wherein the name and value pairs are grouped according to the behavior they control and are grouped in keys;

locating the virtual setting in the configuration module that corresponds to one of the plurality of operating environments;

determining from the configuration module a virtual setting corresponding to the configuration setting in the digital imaging device configuration repository; and changing the corresponding configuration setting in the digital imaging device configuration repository to fulfill the configuration change request that corresponds to one of the plurality of operating environments.

30. The method of claim 29 further comprising the step of passing the virtual setting as a parameter to a software module for use in changing the corresponding configuration setting.

31. The method of claim 29 further comprising the steps of: determining an operating system upon which the digital imaging device is running; and determining a configuration module corresponding to the operating system.

* * * * *